United States Patent
Van Phan et al.

(10) Patent No.: US 10,356,625 B2
(45) Date of Patent: Jul. 16, 2019

(54) METHODS, APPARATUSES AND SYSTEM FOR INTER-OPERATOR SPECTRUM SHARING

(71) Applicant: NOKIA SOLUTIONS AND NETWORKS OY, Espoo (FI)

(72) Inventors: Vinh Van Phan, Oulu (FI); Ling Yu, Kauniainen (FI); Yong Teng, Beijing (CN); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/520,715

(22) PCT Filed: Oct. 21, 2014

(86) PCT No.: PCT/EP2014/072521
§ 371 (c)(1),
(2) Date: Apr. 20, 2017

(87) PCT Pub. No.: WO2016/062334
PCT Pub. Date: Apr. 28, 2016

(65) Prior Publication Data
US 2017/0311172 A1    Oct. 26, 2017

(51) Int. Cl.
*H04W 16/14* (2009.01)
*H04W 48/16* (2009.01)
(Continued)

(52) U.S. Cl.
CPC .......... *H04W 16/14* (2013.01); *H04W 48/16* (2013.01); *H04W 88/08* (2013.01); *H04W 92/20* (2013.01)

(58) Field of Classification Search
CPC ............ H04W 16/14; H04W 72/0453; H04W 72/0486; H04W 28/08; H04W 28/22;
(Continued)

(56) References Cited

U.S. PATENT DOCUMENTS

| 2008/0219213 A1 | 9/2008 | Natarajan et al. |
| 2014/0274089 A1* | 9/2014 | Hassan ................. H04W 40/20 455/452.1 |
| 2015/0319658 A1* | 11/2015 | Padden ................. H04W 16/14 455/436 |

FOREIGN PATENT DOCUMENTS

| WO | 2010063306 A1 | 6/2010 |
| WO | 2013011439 A1 | 1/2013 |

(Continued)

OTHER PUBLICATIONS

IEEE Std 802.11y-2008; IEEE Standard for Information technology—Telecommunications and information exchange between systems—Local and metropolitan area networks—Specific requirements; Part 11: Wireless LAN.
(Continued)

*Primary Examiner* — Kwasi Karikari
(74) *Attorney, Agent, or Firm* — Brake Hughes Bellermann LLP

(57) ABSTRACT

A concept of having at least one representative access node for inter-operator interactions for spectrum sharing between a first operator's network and one or more further operators' networks is introduced, the representative access node being discoverable by a discovery procedure performed by access nodes. According to an example implementation, a method or technique may include performing a discovery procedure for discovering one or more representative access nodes for inter-operator interactions for spectrum sharing between a first operator's network and one or more further operators'
(Continued)

networks, and causing a transmission of results of the discovery procedure to a controlling entity.

9 Claims, 4 Drawing Sheets

(51) Int. Cl.
*H04W 88/08* (2009.01)
*H04W 92/20* (2009.01)

(58) Field of Classification Search
CPC ............... H04W 76/022; H04W 72/14; H04W 72/1257; H04L 5/001; H04L 27/0006; H04L 5/0007; H04L 5/0053; H04L 41/0893
See application file for complete search history.

(56) References Cited

FOREIGN PATENT DOCUMENTS

| | | |
|---|---|---|
| WO | 2013129986 A1 | 9/2013 |
| WO | 2016062332 A1 | 4/2016 |

OTHER PUBLICATIONS

International Search Report and Written Opinion for International Application No. PCT/EP2014/072521, dated Jul. 9, 2015, 11 pages.

* cited by examiner

METHODS, APPARATUSES AND SYSTEM FOR INTER-OPERATOR SPECTRUM SHARING

This application is a national stage entry of PCT Application No. PCT/EP2014/072521 filed Oct. 21, 2014, entitled "METHODS, APPARATUSES AND SYSTEM FOR INTER-OPERATOR SPECTRUM SHARING" which is hereby incorporated by reference in its entirety.

TECHNICAL FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In recent years, the phenomenal growth of mobile Internet services and proliferation of smart phones and tablets has increased use of mobile broadband services, and hence use of available spectrum. A concept called a co-primary spectrum sharing has been introduced to provide additional spectrum. The co-primary spectrum sharing refers to a spectrum access model where two or more network operators providing similar radio services agree on joint use of at least a portion of their licensed spectrum.

BRIEF DESCRIPTION

According to an aspect, there is provided the subject matter of the independent claims. Embodiments are defined in the dependent claims.

BRIEF DESCRIPTION OF DRAWINGS

In the following, the invention will be described in greater detail by means of preferred embodiments with reference to the attached drawings, in which.

DETAILED DESCRIPTION OF SOME EMBODIMENTS

Figure 1:
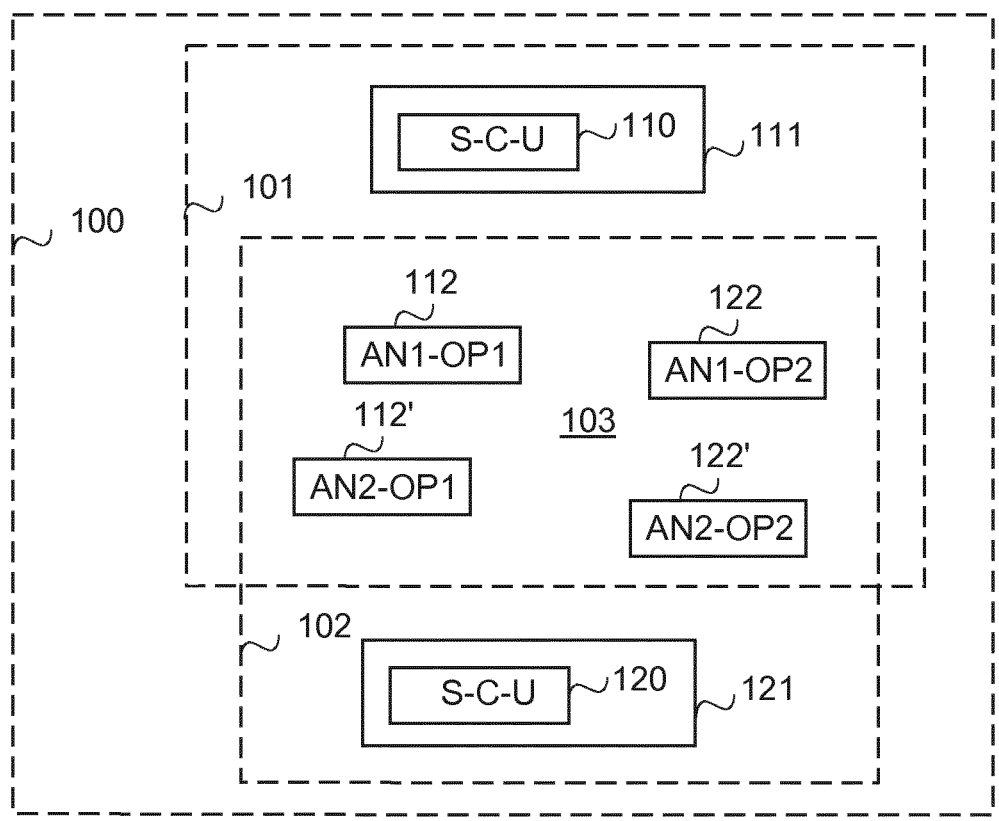
FIG. 1 shows simplified architecture of a system and block diagrams of some apparatuses according to an exemplary embodiment.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any network/system having a sharable spectrum and entities/nodes/apparatuses in such a network/system. Examples of such networks/systems include LTE (Long Term Evolution) access system, Worldwide Interoperability for Microwave Access (WiMAX), LTE Advanced (LTE-A), 4G (fourth generation) and beyond, such as and 5G (fifth generation), or any combination thereof. The specifications of different systems and networks, especially in wireless communication, develop rapidly. Such development may require extra changes to an embodiment. Therefore, all words and expressions should be interpreted broadly and they are intended to illustrate, not to restrict, the embodiment. For example, future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines that run computer program codes using standard or general type servers instead of customized hardware. In other words, the concept proposes to consolidate many network equipment (apparatus, node) types onto standard servers whose hardware can run computer program codes implementing network functions, without a need for installation of new equipment. Cloud computing and/or data storage may also be utilized. In radio communications this may mean node operations to be carried out, at least partly, in a server, host or node operationally coupled to a remote radio head. It is also possible that node operations will be distributed amongst a plurality of servers, nodes or hosts. It should also be understood that the distribution of labour between core network operations and base station operations may differ from that of the LTE or even be non-existent.

One solution to share spectrum is the co-primary spectrum sharing. As said above, the co-primary spectrum sharing refers to a spectrum access model where primary license holders of a similar regulatory status, for example mobile broadband operators, agree on joint use of parts of their licensed spectrum. The spectrum may be shared in frequency, in time and/or in space. The exact usage conditions (policies) would be laid down in commercial agreements between the spectrum holders. Primarily the co-primary spectrum sharing is assumed to be provided by sharing in cooperation between network operators small cells at the same geological area or indoors, without restricting the co-primary spectrum sharing to such a solution. It should be appreciated that the below described functionality and principles can be implemented with any cell size and any spectrum sharing access model, such as light-licensing scheme.

Below different exemplary embodiments are explained using, for a sake of clarity, a centralized scenario in which the spectrum sharing control and coordination functionality is performed by a centralized controlling entity in an operator's network, and the shared spectrum is a radio resource, without limiting the examples and the invention to such a solution. Implementing the below described examples to a distributed scenario in which the spectrum sharing control and coordination functionality, i.e. the functionality of the controlling entity, is distributed to individual access nodes, or to a hybrid scenario in which some of the spectrum sharing control and coordination functionality, i.e. the functionality of the controlling entity, is distributed to individual access nodes while some remain to be performed by the centralized controlling entity, is straightforward process to one skilled in the art.

An extremely general architecture of an exemplary system 100 is illustrated in FIG. 1. FIG. 1 is a simplified system architecture only showing some elements and functional entities, all being logical units whose implementation may differ from what is shown. It is apparent to a person skilled in the art that the system comprises other functions and structures that are not illustrated, for example connections to the core network/system.

The exemplary system 100 illustrated in FIG. 1 comprises a first network 101 of a first network operator OP1 and a second network 102 of a second network operator OP2, the first network comprising a first controlling entity 111 and access nodes 112, 112' and the second network comprising a second controlling entity 121 and access nodes 122, 122', the access nodes of the first operator and the second operator covering at least partly the same area 103. The same area 103, i.e. the overlapping area, may be a service area, or part of a service area, for co-primary spectrum sharing. The service area, also called a service area of interest, may be a local service area, such as a shopping mall, or an office building, certain floors in a building, or a bigger area, such as one or more city blogs, a park, etc. Each network operator may divide a service area into smaller location areas. When a service area is divided into smaller, frequency reusable and more manageable areas beforehand, the smaller service area is a predefined location area. For example, the predefined location areas may be used in a service area deployed with access nodes providing small cells in different networks that use co-primary sharing for certain spectrum resources. When a service area is divided into smaller areas by a network, for example based on where users are and/or how densely there are access nodes, the smaller service area is a determined service area.

In the example of FIG. 1, the access nodes 112, 112', 122, 122' each depicts an apparatus providing over-the-air access to the network the access point are connected to. Examples of such apparatuses include an evolved node B and a base station. The access nodes, or some of them may be configured to implement one or more self-configuration functions and/or one or more self-optimization functions and/or one or more self-healing functions, i.e. one or more self-organizing network (SON) functionalities.

In the example of FIG. 1, the controlling entities 111, 121 each depicts an apparatus providing at least centralized control and coordination for spectrum sharing. For that purpose both illustrated controlling entities comprises a selection and configuring unit 110 (S-C-U) whose functionality will be described in more detail below. Further, in the illustrated example the controlling entities 111, 112 each comprise a memory (not depicted in FIG. 1) for storing information on counterparties. Examples of an apparatus configurable to provide centralized control and coordination for spectrum sharing include a self-organizing network server and an operator and maintenance server. It should be appreciated that in non-centralized solutions some or all of the functionality of the selection and configuring unit 110 may be distributed amongst at least some access nodes.

Typically operators want to have extensive information of their networks and hardware, like traffic demand, capabilities of access nodes, etc. but the operators are not willing to exchange that information with each other. However, for spectrum sharing some information needs to be exchanged between operators. For that purpose all, or most or at least some access points are configured to comprise at least one of the units depicted in FIG. 2.

Figure 2:
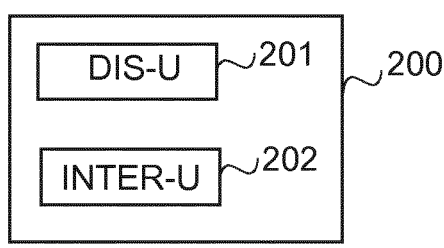
FIG. 2 is a block diagram of an exemplary apparatus.

FIG. 2 is a simplified block diagram illustrating some units for an access node. In the illustrated example, the access node 200 comprises a discovery unit 201 (DIS-U) for a discovery procedure for discovering one or more representative access nodes for inter-operator interactions for spectrum sharing between the access node's operator's network and one or more further operators' network and for reporting results of the discovery procedure, and an inter-operator interaction unit 202 (INTER-U) for mediating spectrum sharing information for spectrum sharing between the access node's operator's network and one or more further operators' network. Functionalities of the units will be described in more detail below. It should be appreciated that there may be access nodes comprising only one of the discovery unit 201 and the inter-operator interaction unit 202.

An access node comprising the inter-operator interaction unit 202 may be selected to be a representative access node of the network for a certain location. The representative access node is for carrying out necessary inter-operator interactions for spectrum sharing. For example, representative access nodes of different networks for the same location may exchange spectrum sharing information, such as control information, or interact on a regular basis according to what the network operators have agreed. Below the control information is used as an example of spectrum sharing information without limiting the examples to such a solution. It should be appreciated that any information may be exchanged, any over-the-air channel, like radio channels, any channel structure, any message format, any signaling procedure, etc. may be used, and therefore they are not discussed in detail herein although some examples may be given. Naturally, counterpart representative access nodes of different operators need to be within each other's radio range, i.e. in proximity to each other, so that they are able to advertise and receive advertisement from each other, and interact with each other for inter-operator spectrum sharing.

Figure 3:
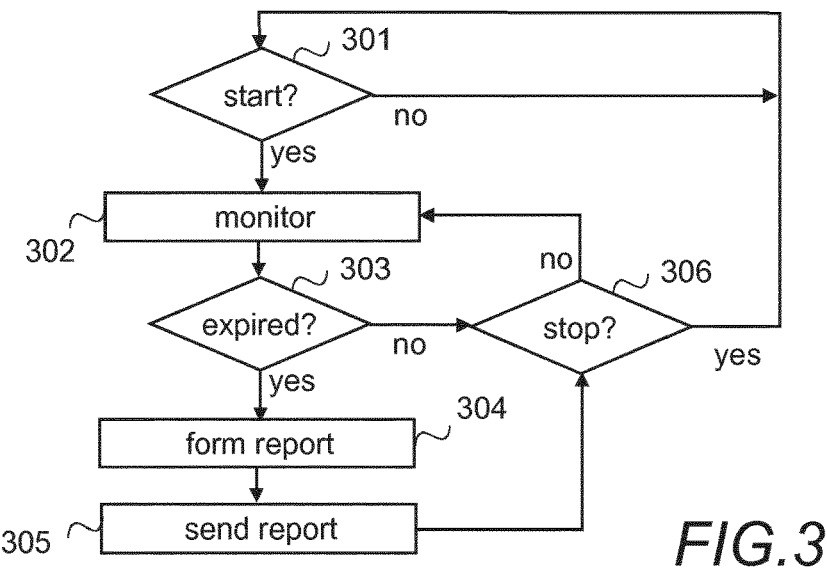
FIGS. 3, 4, 5 and 6 are flow charts illustrating exemplary functionalities.

FIG. 3 is a flow chart illustrating an exemplary functionality of an access node, or more precisely an exemplary functionality of the discovery unit, or what the discovery unit causes the representative access node to perform. For example, sending means that the unit causes a transmission/sending. In the illustrated example it is assumed that the discovery unit is configured to start and stop upon receiving a corresponding command from the controlling entity, and to report at certain discovery intervals to the controlling entity. Further, for the sake of clarity, it is assumed that the discovery interval is a preset value. However, it should be appreciated that the controlling entity, for example, may adjust the discovery interval.

Referring to FIG. 3, in step 301 a start command for a discovery procedure is waited for. Once such a start command is received (step 301), monitoring advertisements of representative access nodes will begin. The monitoring is continued until a discovery interval expires (step 303) or a stop command (step 306) is received.

When the discovery interval expires (step 303), a report on information received in advertisements, i.e. information on discovered representative access nodes, is formed in step 304. In other words, the report contains results on the discovery procedure. The report is sent in step 305 to the controlling entity, and unless a stop command is received (step 306), monitoring is continued in step 302. Information received in an advertisement may only be information that a representative access node exist, or it may also contain co-primary sharing control information. In addition to the information received in the advertisements, the report may comprise information on the access node's capabilities, location, traffic demand, spectrum use, load status, etc.

In another implementation the monitoring of advertisements of representative access nodes is performed continuously, i.e. without a specific start command, and the reports are sent periodically (i.e. the discovery process is performed periodically). In other words, steps 301 and 306 are omitted.

In a still further implementation the monitoring of advertisements of representative access nodes is performed so that one report is formed and sent in response to receiving a command for discovery. In other words, in step 301 a discovery command is received, and at least step 306 is omitted, possibly also step 303 is omitted.

In another implementation the monitoring is performed all the time, but a report is formed and sent only in response to a start command or a discovery inquiry.

By means of continuous monitoring the controlling entity remains all the time aware of spectrum sharing possibilities in the location area.

By reporting discovery outcomes only on a specific request network capacity is used to convey information only when the information is needed.

It should be appreciated that the access node may be pre-configured to report all discovered representative access nodes, including operator's own representative access nodes, or only discovered representative access nodes of other operators, or those that were not discovered during previous discovery procedure (including or not including operator's own representative access nodes), and if there is no reportable representative access nodes, the access node may be pre-configured not to send a report. Instead of pre-configuration, or in addition to it (or more precisely, overruling the pre-configured settings), the received command may contain reporting instructions which the access nodes follows.

Figure 4:
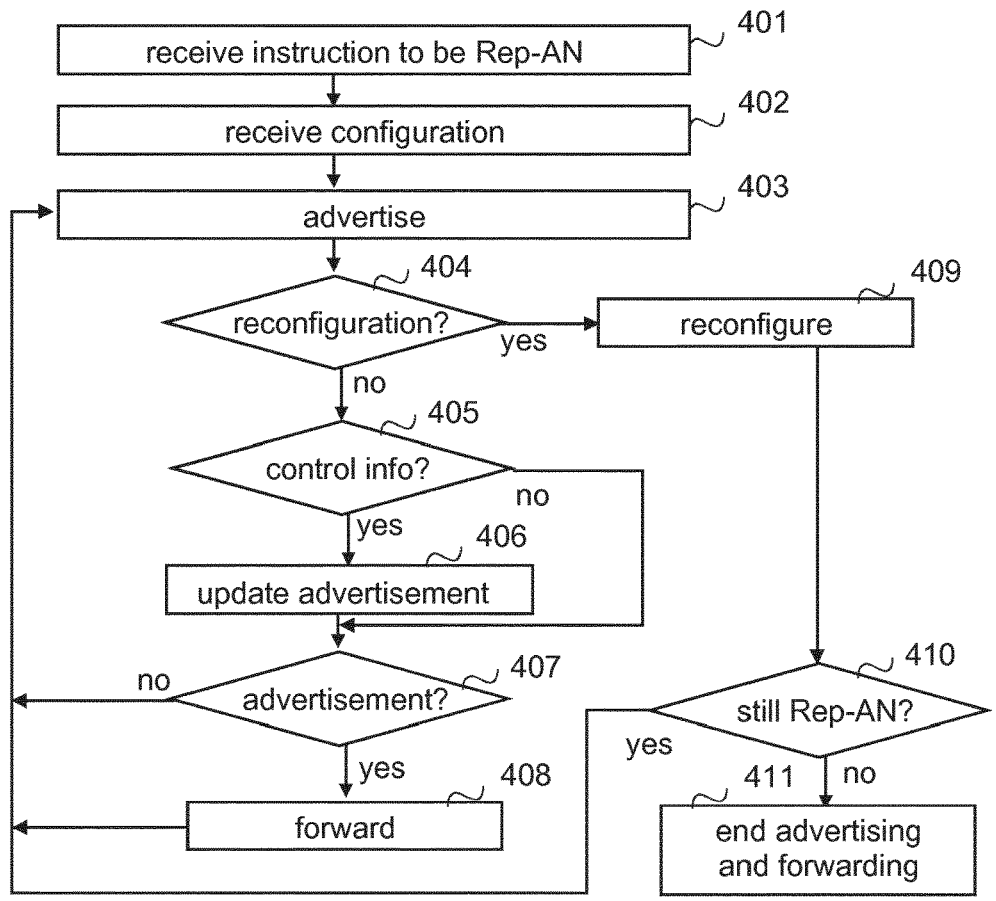

FIG. 4 is a flow chart illustrating an exemplary functionality of an access node, or more precisely an exemplary functionality of the inter-operator interaction unit, or what the inter-operator interaction unit causes the access node to perform. For example, advertising means that the unit causes a transmission/sending advertisements. In the illustrated example it is assumed that the access node receives configuration information from the controlling entity and receives as co-primary sharing control information on resource release/increase in the operators network within the location area, and that a representative access node is a mediator of information between the controlling entity and one or more other networks, the information being mediated by broadcasting advertisements and forwarding received broadcast advertisements. Further, for the sake of clarity, it is assumed that advertisements are received only from representative access nodes of other networks. Received advertisements from own network may be treated in the same way, i.e. forwarded to the controlling entity, or simply ignored.

Referring to FIG. 4, when an instruction to be a representative access node (Rep-AN) is received in step 401 from the controlling entity and configuration information is received in step 402, the access node advertises in step 403 that it is the representative access node by sending advertisements as broadcast.

The advertising is continued until reconfiguration information (step 404), co-primary sharing control information (step 405), or an advertisement (step 407) is received.

If reconfiguration information is received (step 404), the access node updates in step 409 its configuration, i.e. reconfigures itself, accordingly. For example, the access node may be reconfigured to send advertisement less or more frequently. The reconfiguration may be also a reconfiguration back to a normal access node (step 410). If that is the case, the advertising ends (step 411) as well as forwarding received advertisements, otherwise the process is continued in step 403.

If co-primary sharing control information is received (step 405), such as resource increase or release, the advertisement is updated in step 406 to contain the control information, and the advertising is continued in step 403.

If an advertisement is received (step 407), the advertisement, or its content or control information the advertisement includes, is forwarded in step 408 to the controlling entity, and the advertising is continued in step 403.

When the access node is a self-organizing network node, it may configure itself and no actual configuration information is received. Nevertheless, the node may receive spectrum sharing information, like spectrum adjustment rules (based on the agreement between operators), information on operators with which spectrum sharing agreements have been made, etc. However, even if no actual configuration information is needed/receive, the access node may receive reconfiguration information comprising an instruction not to be representative access node is received (i.e. 410 are omitted and from step 409 the process proceeds to step 411, or they are processed in a reversed order or simultaneously, and step 402 may be omitted if the spectrum sharing information is received in step 401).

Figure 5:
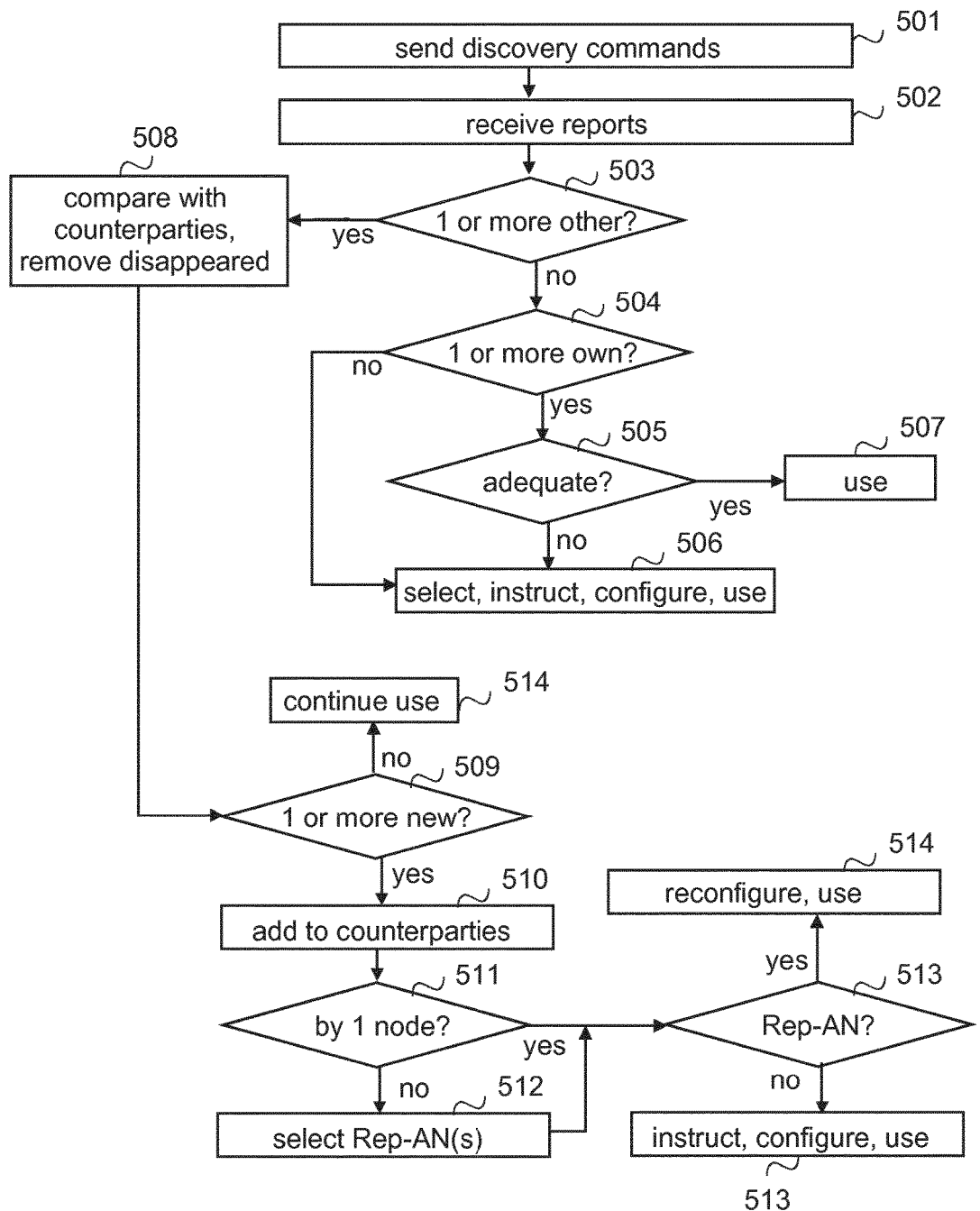

FIG. 5 is a flow chart illustrating an exemplary functionality of a controlling entity, or more precisely an exemplary representative access node selection functionality of the selection and configuring unit, or what the selection and configuring unit causes the representative access node to perform. For example, sending means that the unit causes a transmission/sending. In the illustrated example the functionality is performed, for the sake of clarity, for one specific location area.

Referring to FIG. 5, the controlling entity sends in step 501 discovery commands to access nodes in the location area, and receives in step 502 discovery reports (i.e. results on discovery procedures) from the access nodes. The reports are processed by checking in step 503 whether or not at least one of the reports contains information on one or more representative access nodes of other operators. If not, then it is checked in step 504, whether or not at least one of the reports contains information on one or more representative access nodes of the operator. If one or more representative access nodes was found, i.e. was at least in one of the received reports, it is checked in step 505, for each found own representative access node, whether it, or they, is/are adequate for the specific location area. If yes, the representative access node(s) is(are) used also for the location area. If not (step 505), or if all reports were empty (step 504), i.e. no representative access node was discovered, the controlling entity selects in step 506 at least one of the access nodes to be a representative access node, and instructs it/them correspondingly. The selection may be performed according to predetermined criteria/rules which are freely definable by the operator. For example, a capability and/or a location and/or a resource use of the access node and/or a cell density (deployment situation) may be used as selection criteria. The selected access node(s) is(are) also configured in step 506 by sending/causing transmission of configuration information and used for co-primary spectrum sharing in the location area. The selected node may be configured to use a less frequent broadcasting scheme to announce its present and to broadcast co-primary sharing control information. Further, the configuring may include informing (causing transmission of information) other access nodes on the selected representative access node(s). It should be appreciated that in an implementation sending the configuration may act as an instruction to be a representative access node, and hence no separate instruction is sent.

If at least one of the reports contains information on one or more representative access nodes of other operators (step 503), in the illustrated the discovered representative access nodes of other operators are compared in step 508 with the representative access nodes of other operators in the counterpart list, i.e. received ones are compared with previously discovered counterparties, and if the counterpart list contains a counterpart that is not in the received information, in the illustrated example the counterpart is removed in step 508 from the list. Hence, shut down, or for some other reason disappeared, representative access nodes are removed from the list. Then it is checked, in step 509, whether or not there are one or more new discovered representative access nodes that are not in the counterpart list. If there are, each new representative access node is added in step 510 to the counterpart list, and it is checked in step 511 for each new representative access node, whether or not the new representative access node was discovered by one access node.

In the illustrated example, for each new representative access node that was discovered by two or more access nodes (step 511), a representative access node is selected in step 512. Any selection rule may be used. For example, the one of the access nodes which discovered the biggest number of representative access nodes of other operators may be selected to be a representative access node, and hence a counterpart to the new representative access node; or if one of the access nodes is already a representative access nodes, it may be selected. For each selected representative access node it is checked in step 513, whether or not it is already functioning as the representative access node. If yes, it is used in step 514 also with the new representative access node of the other operator, and possibly reconfigured. For example, it may be configured to use more frequent broadcasting scheme. Another example is that in half-duplex operation, in which a representative access node is not able to simultaneously transmit to and receive from other representative access nodes, the length of a transaction period with transmitting/receiving pattern may be adjusted. For example, the adjustment may be performed by adopting the transmitting/receiving pattern to be such that each representative access node will have sufficient amount of slots allocated within the transaction period to transmit to or receive from other representative access nodes. If the selected representative access node is not functioning as the representative access node (step 513) it is instructed, configured and used, as described above with step 506.

If the new representative access node was discovered by only one access node (step 511), the access node is treated as a selected representative access node and the process proceeds to step 513 to check, whether or not it is already functioning as the representative access node.

Although the result of the above described functionality may be that there is one representative access node for a specific location area in the operator's network, it should be appreciated that the controlling entity may be configured to perform the selection in such a way that there are at least two representative access nodes for the specific location. Such a solution enhances reliability and robustness. For example, there may be one representative access node for broadcasting advertisements and one representative access node for receiving advertisements from other networks when half-duplex operation is implemented.

Although in the example it is assumed that a counterpart is removed from the list at a first time it is not discovered, it should be appreciated that the removal may be performed later, for example when it is not discovered in three consecutive discovery procedure.

Figure 6:
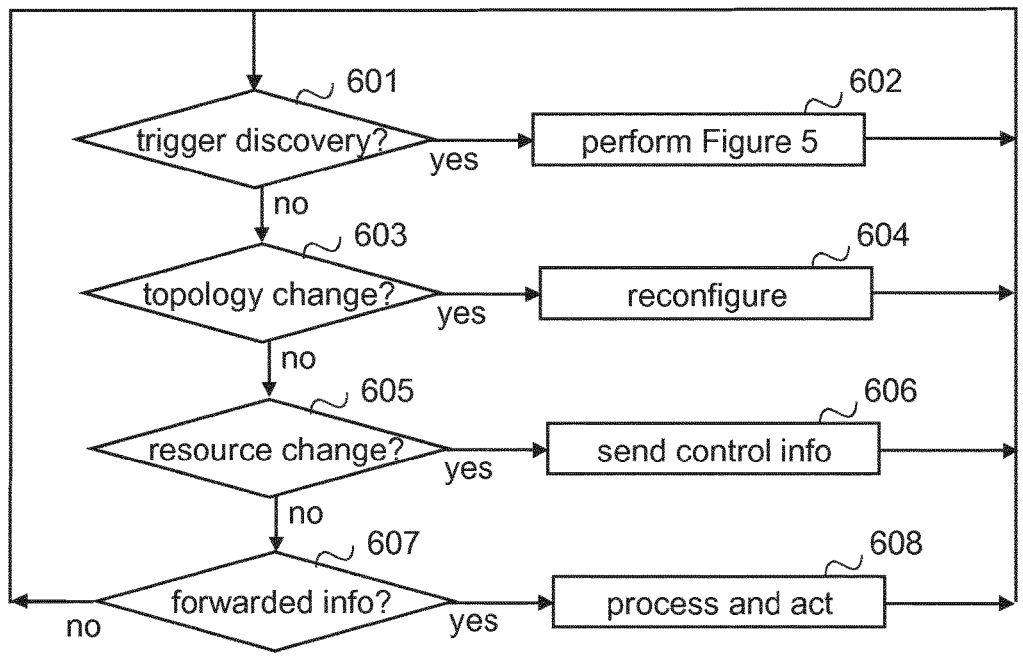

FIG. 6 is a flow chart illustrating an exemplary functionality of a controlling entity, or more precisely an exemplary functionality of the selection and configuring unit for co-primary spectrum sharing operations, or what the selection and configuring unit causes the representative access node to perform. For example, sending means that the unit causes a transmission/sending.

Referring to FIG. 6, it is monitored whether or not a discovery procedure is triggered (step 601), whether or not a network topology change is detected (step 603), whether or not a change in spectrum resource use/need is detected (step 605), and whether or not forwarded information for spectrum sharing is received from a representative access node (step 607).

The discovery procedure may be triggered periodically, and/or in response to the operator making another agreement, for example. However, it bears no significance what triggers the controlling entity to start the discovery procedure; when it is triggered (step 601), the procedure described above with FIG. 5 is performed in step 602, and possibly new representative access nodes being selected.

A network topology may change because many cells are shut down, for example because of a traffic volume decreased, or because many cells are introduced due to a traffic volume increased. If a network topology change is detected (step 603), the controlling entity may reconfigure in step 604 one or more representative access nodes. The reconfiguring covers alternatives, like configuring a representative access node to be a normal access node, or adjusting the broadcasting scheme. Further, although not illustrated in FIG. 6, a network topology change may trigger the discovery procedure.

If the use/need for network resources (step 605), especially of the spectrum to be shared, changes, for example not all resources are used, or there is need for extra resources, in the illustrated example corresponding control information is sent in step 606 to representative access node (or nodes) which then advertise the information to other networks. For example, the controlling entity may release some resources in the network and forward this as control information to be advertised by the representative access node(s).

If forwarded information for spectrum sharing, like information on available resources in another network or a request for obtaining resources from another network, is received from a representative access node (step 607), the information is processed in step 608 and if any act is needed, based on the processed information and/or co-primary agreement, it is performed. For example, the controlling entity may check, whether there are releasable resources if the other network advertises that it needs more resources.

As is evident from the above, a dynamic sharing of spectrum is facilitated by enabling frequent on-the-fly exchange of control information between involved parties.

Although in the above advertisements and broadcast are used as an example of delivering inter-operator information, it should be appreciated that some or all of the information is delivered via counterpart representative access nodes as non-broadcast messages, and such messages may be based on request-response procedure, or indication-response/confirmation, for example. For example, a representative access node may broadcast information "I am here and represent operator X", and general control information, whereas detailed control information is exchanged using non-broadcast messages.

The steps, messages (i.e. information exchange) and related functions described above in FIGS. 3, 4, 5 and 6 are in no absolute chronological order, and some of the steps may be performed simultaneously or in an order differing from the given one. Other functions can also be executed between the steps/points or within the steps/points, and other messages sent. For example, an access node may select itself to a representative access node in the hybrid or distributed scenario. Further examples include that a representative access node may request the controlling entity to configure the representative access node to be a normal access node, or the representative access node may request the controlling entity to select another representative access node. Some of the steps/messages or part of the steps/messages can also be left out or replaced by a corresponding step/message or part of the step/message. Further, the information exchange may be internal information exchange.

The techniques described herein may be implemented by various means so that an apparatus/network node implementing one or more functions of a corresponding apparatus/network node described with an embodiment/example/implementation comprises not only prior art means, but also means for implementing the one or more functions of a corresponding apparatus described with an embodiment and it may comprise separate means for each separate function, or means may be configured to perform two or more functions. For example, the selection and configuring unit and/or the discovery unit and/or the inter-operator interaction unit and/or algorithms may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 7:
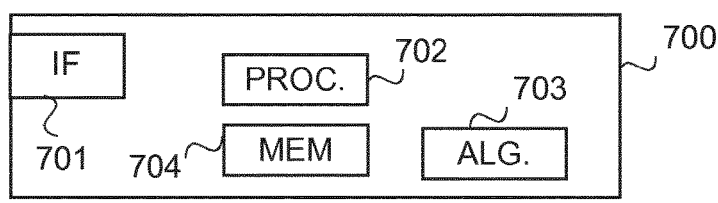
FIG. 7 is a schematic block diagram of an exemplary apparatus.

FIG. 7 is a simplified block diagram illustrating some units for an apparatus 700 configured to be a wireless access apparatus (access node), or a controlling apparatus (controlling entity) comprising at least the selection and configuring unit and/or the discovery unit and/or the inter-operator interaction unit, or corresponding functionality or some of the corresponding functionality if hybrid or distributed scenario is implemented. In the illustrated example, the apparatus comprises an interface (IF) 701 for receiving and transmitting information, a processor 702 configured to implement at least the selection and configuring unit and/or the discovery unit and/or the inter-operator interaction unit, described herein, or at least part of corresponding functionality as a sub-unit functionality if hybrid or distributed scenario is implemented, with corresponding algorithms 703, and memory 704 usable for storing a computer program code required for the selection and configuring unit and/or the discovery unit and/or the inter-operator interaction unit, or a corresponding unit or sub-unit, i.e. the algorithms for implementing the functionality. The memory 704 is also usable for storing other possible information, like information on counterparties associated with corresponding representative access nodes, or information which representative access nodes are for transmitting and which for receiving.

In other words, an apparatus configured to provide the wireless access apparatus (access node), or a controlling apparatus (controlling entity), or an apparatus configured to provide one or more corresponding functionalities, is a computing device that may be any apparatus or device or equipment or node configured to perform one or more of corresponding apparatus functionalities described with an embodiment/example/implementation, and it may be configured to perform functionalities from different embodiments/examples/implementations. The selection and configuring unit and/or the discovery unit and/or the inter-operator interaction unit, as well as corresponding units and sub-unit and other units, described above with an apparatus may be separate units, even located in another physical apparatus, the distributed physical apparatuses forming one logical apparatus providing the functionality, or integrated to another unit in the same apparatus.

The apparatus configured to provide the wireless access apparatus (access node), or a controlling apparatus (controlling entity), or an apparatus configured to provide one or more corresponding functionalities may generally include a processor, controller, control unit, micro-controller, or the like connected to a memory and to various interfaces of the apparatus. Generally the processor is a central processing unit, but the processor may be an additional operation processor. Each or some or one of the units/sub-units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/sub-units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed and/or will be programmed by downloading computer program code (one or more algorithms) in such a way to carry out one or more functions of one or more embodiments/implementations/examples. An embodiment provides a computer program embodied on any client-readable distribution/data storage medium or memory unit(s) or article(s) of manufacture, comprising program instructions executable by one or more processors/computers, which instructions, when loaded into an apparatus, constitute the plan managing unit 125. Programs, also called program products, including software routines, program snippets constituting "program libraries", applets and macros, can be stored in any medium and may be downloaded into an apparatus. In other words, each or some or one of the units/sub-units and/or the algorithms described above may be an element that comprises one or more arithmetic logic units, a number of special registers and control circuits.

Further, the apparatus configured to provide the wireless access apparatus (access node), or a controlling apparatus (controlling entity), or an apparatus configured to provide one or more corresponding functionalities may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. In other words, the memory may be any computer-usable non-transitory medium within the processor or external to the processor, in which case it can be communicatively coupled to the processor via various means. The memory may also store computer program code such as software applications (for example, for one or more of the units/sub-units/algorithms) or operating systems, information, data, content, or the like for the processor to perform steps associated with operation of the apparatus in accordance with examples/embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. An example of an external memory includes a removable memory detachably connected to the apparatus, a distributed database and a cloud server.

The apparatus configured to provide the wireless access apparatus (access node), or a controlling apparatus (controlling entity), or an apparatus configured to provide one or more corresponding functionalities may generally comprise different interface units, such as one or more receiving units and one or more sending units. The receiving unit and the transmitting unit each provides an interface in an apparatus, the interface including a transmitter and/or a receiver or any other means for receiving and/or transmitting information, and performing necessary functions so that the information, etc. can be received and/or sent. The receiving and sending units may comprise a set of antennas, the number of which is not limited to any particular number.

Further, the apparatus may comprise other units, and it may be called also a network apparatus, or a node.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
receiving, by an access node in a first operator's network, information for acting as a representative access node, the information comprising at least one of configuration information and spectrum sharing information;
causing broadcast of one or more advertisements indicating that the access node is the representative access node for spectrum sharing;
performing, by the access node in the first operator's network, a discovery procedure for discovering one or more representative access nodes for inter-operator interactions for spectrum sharing between the first operator's network and one or more further operators' networks; and
causing transmission of results of the discovery procedure to a controlling entity.

2. A method as claimed in claim 1, further comprising:
performing the discovery procedure periodically and/or in response to receiving a corresponding command from the controlling entity.

3. A method as claimed in claim 1, further comprising:
receiving information on spectrum sharing from one or more other representative access nodes; and
causing transmission of the information to the controlling entity.

4. A method as claimed in claim 1, further comprising:
receiving updated spectrum sharing information; and
updating the advertisement correspondingly.

5. A method according to claim 1, wherein the spectrum sharing information comprises at least one of control information defining how to broadcast, information on available spectrum resources and information on need for spectrum resources.

6. A wireless access apparatus comprising:
at least one processor; and
at least one memory including computer program code;
wherein the at least one memory and the computer program code are configured to, with the at least one processor;
receive information for acting as a representative access node, the information comprising at least one of configuration information and spectrum sharing information;
cause broadcast of one or more advertisements indicating the representative access node for spectrum sharing;
perform a discovery procedure for discovering one or more representative access nodes for inter-operator interactions for spectrum sharing between a first operator's network and one or more further operators' networks; and
cause transmission of results of the discovery procedure to a controlling entity.

7. A wireless access apparatus as claimed in claim 6, wherein the at least one memory and the computer program code are further configured to, with the at least one processor, perform the discovery procedure periodically and/or in response to receiving a corresponding command from the controlling entity.

8. A wireless access apparatus as claimed in claim 6, wherein the at least one memory and the computer program code are further configured to, with the at least one processor:
receive information on spectrum sharing from one or more other representative access nodes; and
cause transmission of the information to the controlling entity.

9. A wireless access apparatus as claimed in claim 6, wherein the at least one memory and the computer program code are further configured to, with the at least one processor:
receive updated spectrum sharing information; and
update the advertisement correspondingly.

* * * * *